No. 638,476.  
S. RÜCKERSBERG.  
ANIMAL TRAP.  
(Application filed Dec. 30, 1898.)  
(No Model.)  
Patented Dec. 5, 1899.  
2 Sheets—Sheet 1.
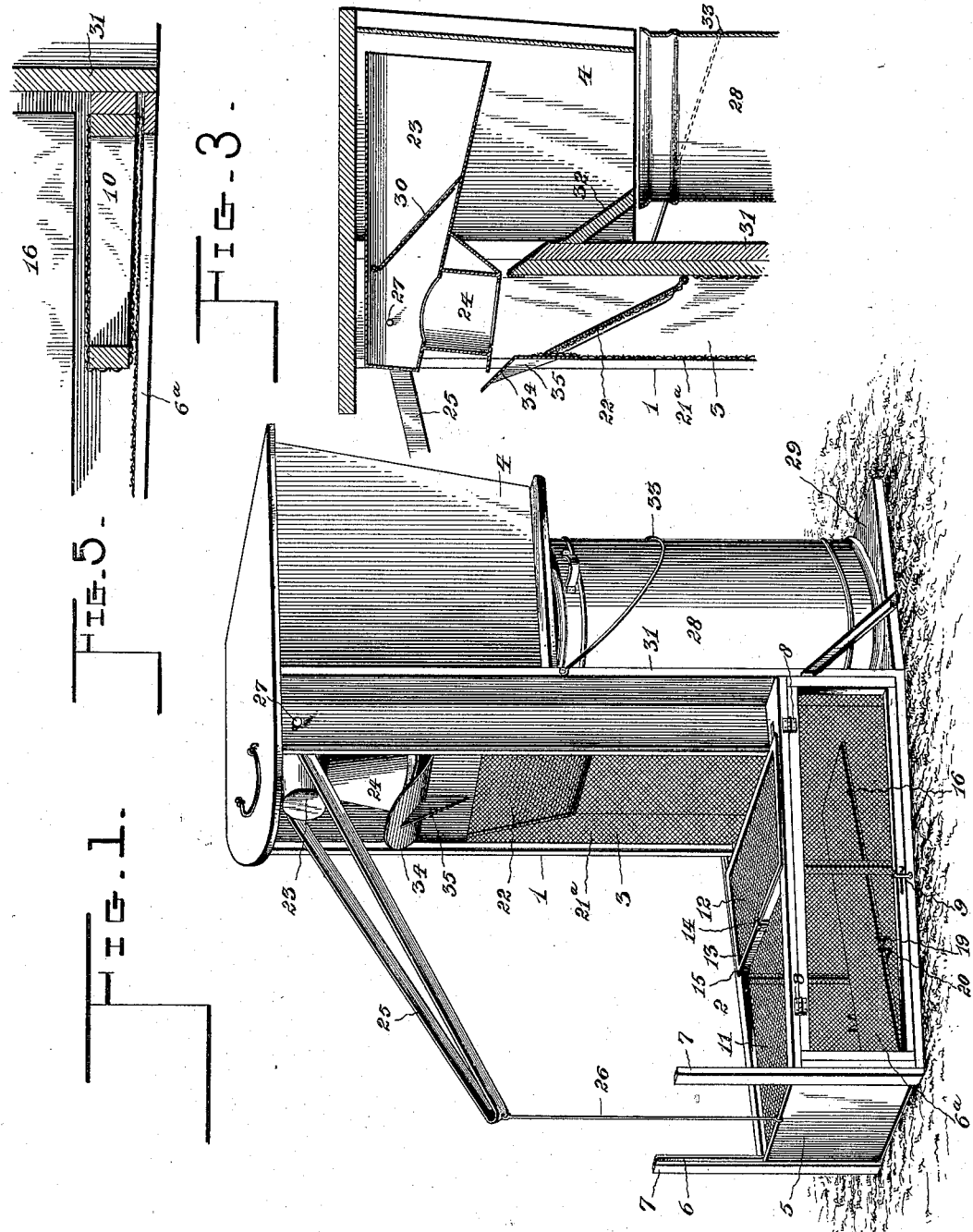
Witnesses  
John F. Senfferwied  
J. F. Riley
S. Rückersberg, Inventor  
By his Attorneys,  
C. A. Snow & Co.

No. 638,476. Patented Dec. 5, 1899.
S. RÜCKERSBERG.
ANIMAL TRAP.
(Application filed Dec. 30, 1898.)
(No Model.) 2 Sheets—Sheet 2.
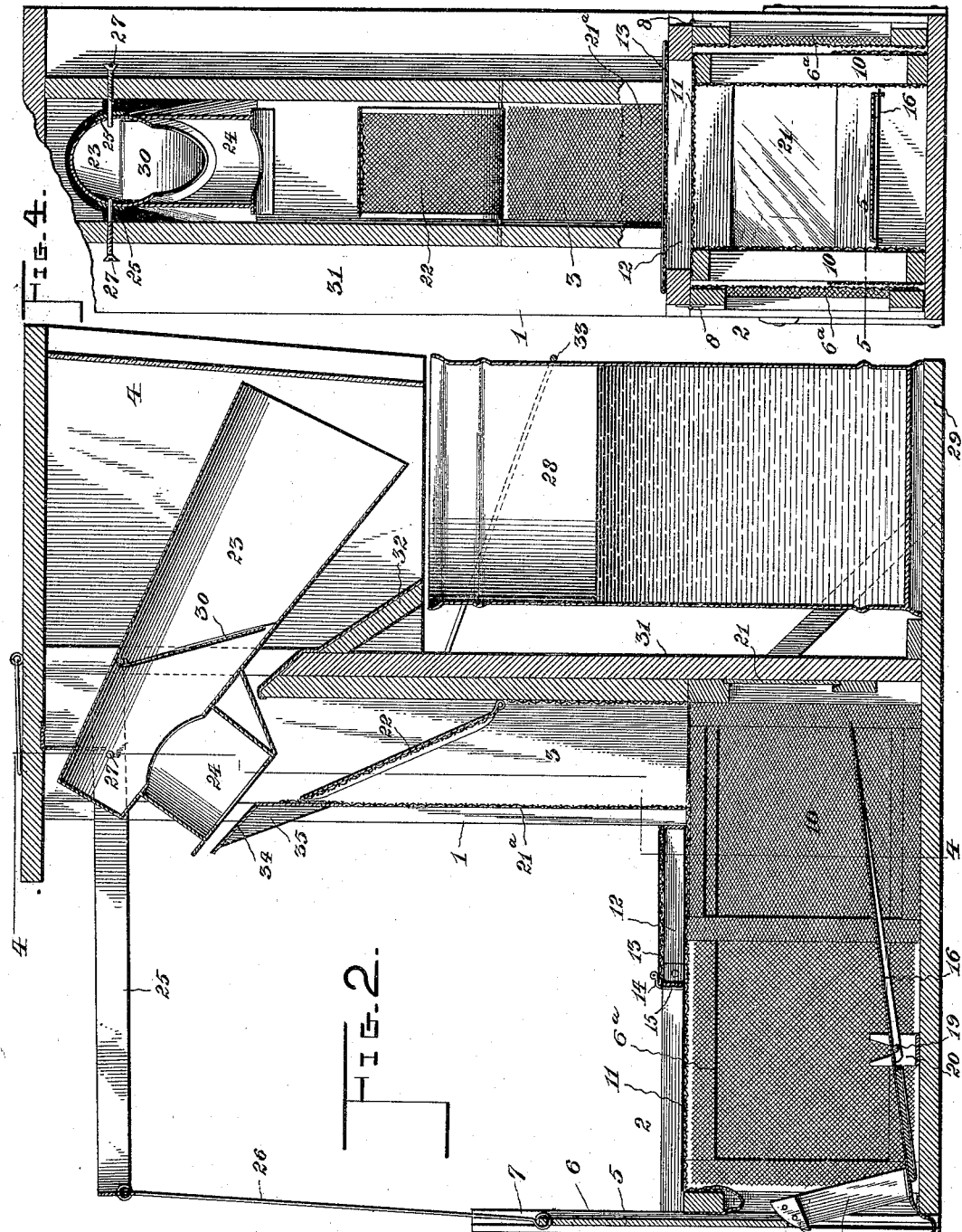

UNITED STATES PATENT OFFICE.

SIMON RÜCKERSBERG, OF SAN ANTONIO, TEXAS.

ANIMAL-TRAP.

SPECIFICATION forming part of Letters Patent No. 638,476, dated December 5, 1899.

Application filed December 30, 1898. Serial No. 700,728. (No model.)

*To all whom it may concern:*

Be it known that I, SIMON RÜCKERSBERG, a citizen of the United States, residing at San Antonio, in the county of Bexar and State of Texas, have invented a new and useful Animal-Trap, of which the following is a specification.

The invention relates to improvements in animal-traps.

The object of the present invention is to improve the construction of animal-traps and to provide a simple and comparatively inexpensive one adapted to capture successively a large number of animals and capable of being reset automatically by the captured animals and of preventing the same from obtaining access to the bait.

The invention consists in the construction and novel combination and arrangement of parts hereinafter fully described, illustrated in the accompanying drawings, and pointed out in the claim hereto appended.

In the drawings, Figure 1 is a perspective view of a trap constructed in accordance with this invention. Fig. 2 is a vertical longitudinal sectional view, the trap being set. Fig. 3 is a similar view of the upper portion, illustrating the arrangement of the tilting chute when the trap is sprung. Fig. 4 is a transverse sectional view on line 4 4 of Fig. 2. Fig. 5 is a horizontal sectional view on line 5 5 of Fig. 4.

Like numerals of reference designate corresponding parts in all the figures of the drawings.

1 designates the frame or casing of the trap, comprising a lower front portion 2, a central vertical portion 3, and a rearwardly-extending upper portion 4. The lower front portion 2 forms the entrance to the trap, and the central vertical portion affords communication between the said lower portion 2 and the upper rearwardly-extending portion 4 to permit an animal after it has been captured to escape into the latter from the lower portion 2. The outer end of the lower portion 2 is provided with a vertically-movable door 5, sliding in vertical ways 6 of uprights or posts 7, which project above the top of the front portion 2 to support the door in an elevated position when the trap is set. The sides 6ª of the lower portion 2 are hinged at the top at 8 and consist of an oblong frame having a sheet of wire-gauze or similar material attached to it. The hinged sides, which are secured when closed by suitable fastening devices 9, afford convenient access to the interior of the trap for the purpose of cleaning the same and to supply bait to feed-receptacles 10, arranged at the rear portions of the sides of the bottom of the frame or casing 1 and constructed of wire-gauze, as shown, in which the outer wall extends only part way up from the bottom, thereby leaving a space through which the bait may be inserted or removed, as in a pocket. The wire-gauze exposes the bait sufficiently to attract the animals, but at the same time prevents them from obtaining access to the same. The bait-receptacles 10 open outwardly, and their open sides are covered by the hinged sides 6ª.

The top 11 of the lower portion 2 of the frame or casing is constructed of wire-gauze and is provided with a bait-receptacle 12, having a hinged door 13, held in its closed position by a fastening device 14 and adapted to be readily opened to permit fresh bait to be supplied and the old bait to be removed. The door 13 is hinged at its rear edge, and the walls of the bait receptacle or compartment 12 are formed by the longitudinal top bars or pieces of the frame of the trap and by a transverse strip 15, the top 11 of the portion 2 forming the bottom of the bait-receptacle 12. Instead, however, of arranging the bait-receptacles in the manner shown and providing hinged sides or doors for the same the trap may when constructed on a small scale for mice be provided with any suitable arrangement of bait-receptacles to cheapen the construction.

Within the lower front portion 2 of the trap is arranged a longitudinal treadle 16, fulcrumed in advance of its center and having a weighted front portion adapted to overbalance the rear portion slightly and hold the same normally elevated. The front portion of the treadle carries an upwardly-extending arm 17, arranged to support the vertically-movable door 5 in an elevated position and provided with an inclined upper supporting edge 18, adapted to be withdrawn readily from beneath the door to permit the latter to drop and close the trap when the rear portion of the treadle is depressed by an animal passing over it. The treadle is provided with a pintle-rod 19, removably arranged in bearings 20, to permit the treadle to be readily detached and replaced, thereby greatly facilitating cleaning the trap. The rear end of the treadle is provided with a tapering brace 36 upon its under surface, which extends from in front of the pintle and for which it forms bearings back to the extreme end, and the front portion is provided with a counterweight 37, which may be secured to the under side thereof in front of the pintle by any suitable means, as a cord or wire. The metal plate 38, which is curved in cross-section at its outer portion for the reception of the lower edge of the door 5, extends back over the front end of the bottom of the trap and forms a protector therefor to prevent the animal from gnawing through under the door and escaping.

The back or rear wall of the front portion 2 of the trap is provided with a mirror 21, so that an animal looking into the trap and seeing its image reflected in the mirror will not be deterred from entering.

After an animal enters the trap and springs the same it will become frightened and seek to escape, and the central vertical portion 3 is provided with a passage-way having a wire-gauze front wall 21ª to admit light to it and also to afford means for enabling an animal to ascend. The rear wall is also provided with a lining of wire-gauze or other suitable material to enable a rat or other animal to climb, and a hinged plate or cut-off 22 is arranged within the passage-way to prevent the return of an animal. The plate 22, which is also provided with a roughened surface, such as wire-gauze, is hinged at its lower edge, and its upper edge rests against the front of the passage-way, the plate inclining downward therefrom to the rear wall. The hinged plate or cut-off is readily moved backward to permit an animal to pass, and after an animal has passed it it will drop back automatically to its initial position and prevent the animal from descending the vertical passage-way.

Within the upper rearwardly-extending portion 4 is arranged a pivoted chute 23, which, as illustrated in the accompanying drawings, may be in the shape of a tapering tube, but which may be of any other desired form. The front end of the chute is provided with a depending elbow or extension 24, and it has an outwardly-extending arm 25, projecting over the front portion 2 and terminating above the door, with which it is connected by the wire or rod 26, whereby the movement of the pivoted chute operates to reset the trap. When an animal reaches the top of the vertical passage, it will enter the chute, which is then in a horizontal position, and as the same is pivoted near its front end by screws 27 it will be swung downward when the animal passes beyond the pivot and will precipitate it into a can or receptacle 28. The screws 27 removably pivot the tubular chute within the upper portion of the casing and enable the same to be readily detached when desired. The can or receptacle is arranged on a platform 29 and is located beneath the rearwardly-extending portion 4, it being designed to be partially filled with water to drown the animals. The pivoted chute is provided with a hinged door or cut-off 30, extending downward and rearward from the top and adapted to permit an animal to pass it readily in moving rearward. This hinged door is adapted to cut off the retreat of an animal, so that it is impossible for an animal to escape through the chute. The downward movement of the chute opens the door and sets the trap, and when the latter is again sprung the door will return the chute to a horizontal position.

The platform 29 consists of a rearward extension of the floor or bottom of the trap, and the rear wall 31 of the rearward extension 4 is preferably transparent. The front wall of the upper portion 4 is provided with an inclined portion 32, preferably constructed of tin or other suitable metal, to cause an animal to slip backward should it attempt to climb up the walls of the trap. The can or receptable is designed to fit snugly against the bottom of the upper portion 4, and when a large trap is constructed the weight of the receptacle and its contents is sufficient to hold it on the platform 29; but in smaller traps a hinged bail-shaped locking wire or piece 33 is preferably provided for retaining the can on the platform. The bail-shaped locking-piece is mounted on the upper portion of the trap and is adapted to drop down over the upper portion of the can.

The vertical connecting portion 3 of the trap is provided at a point below the depending extension or elbow of the chute with an inclined lip 34, supported by a flange 35 and arranged to cover the lower end of the said elbow or extension when the same is swung forward and outward by the downward movement of the chute.

The invention has the following advantages: The trap, which is simple and comparatively inexpensive in construction, automatically resets itself after each operation, and it is adapted to catch a large number of animals without requiring any attention on the part of the possessor, as the bait is not consumed. Access is readily had to all portions of the trap, so that it may be frequently cleaned without inconvenience.

Changes in the form, proportion, and minor details of construction may be resorted to without departing from the spirit or sacrificing any of the advantages of this invention.

What is claimed is—

A trap comprising a casing composed of a lower front portion provided with a rearwardly-extending platform, an intermediate upwardly-extending portion, and a rearwardly-disposed upper portion located above the rearwardly-extending platform, a tubular chute provided near its front end with a depending extension, the screws 27 removably pivoting the tubular chute within the upper portion of the casing, means for setting and tripping the trap, the removable receptacle arranged on the platform, and the bail-shaped locking-wire 33 hinged to the intermediate portion of the casing at opposite sides thereof and embracing the receptacle and adapted to be swung upward above the bottom of the upper portion of the casing to release the receptacle, substantially as described.

In testimony that I claim the foregoing as my own I have hereto affixed my signature in the presence of two witnesses.

SIMON RUCKERSBERG.

Witnesses:
A. LEVY,
SALLY SEELMANN.